United States Patent
Kondru et al.

(10) Patent No.: US 8,712,452 B2
(45) Date of Patent: Apr. 29, 2014

(54) ENTERPRISE SEAMLESS MOBILITY

(75) Inventors: Ramesh Kondru, Secunderabad (IN);
Saji Xavier, Indiranagar (IN)

(73) Assignee: Aruba Networks, Inc., Sunnyvale, CA (US)

( * ) Notice: Subject to any disclaimer, the term of this patent is extended or adjusted under 35 U.S.C. 154(b) by 808 days.

(21) Appl. No.: 12/168,756

(22) Filed: Jul. 7, 2008

(65) Prior Publication Data

US 2009/0163232 A1 Jun. 25, 2009

Related U.S. Application Data

(63) Continuation-in-part of application No. 11/963,275, filed on Dec. 21, 2007.

(51) Int. Cl.
*H04W 4/00* (2009.01)

(52) U.S. Cl.
USPC ............. 455/466; 455/552.1; 455/553.1; 455/554.1; 455/554.2; 455/555

(58) Field of Classification Search
USPC .......... 455/466, 552.1, 553.1, 554.1, 554.2, 455/555
See application file for complete search history.

(56) References Cited

U.S. PATENT DOCUMENTS

| | | | |
|---|---|---|---|
| 6,445,921 B1 | 9/2002 | Bell | |
| 6,614,786 B1 | 9/2003 | Byers | |
| 6,975,602 B2 | 12/2005 | Anderson | |
| 7,035,260 B1 * | 4/2006 | Betta et al. | 370/392 |
| 7,231,205 B2 * | 6/2007 | Guyot et al. | 455/414.1 |
| 7,308,263 B2 | 12/2007 | Gallagher et al. | |
| 7,414,992 B2 | 8/2008 | Hirsbrunner et al. | |
| 7,492,872 B1 | 2/2009 | Di Carlo et al. | |
| 7,565,145 B2 | 7/2009 | Gallagher et al. | |
| 7,606,190 B2 | 10/2009 | Markovic et al. | |
| 7,630,724 B2 * | 12/2009 | Beyer et al. | 455/457 |
| 7,768,977 B2 | 8/2010 | Camp, Jr. | |
| 7,826,868 B2 * | 11/2010 | Robbins et al. | 455/560 |
| 8,326,276 B2 * | 12/2012 | Chin et al. | 455/416 |
| 2002/0111198 A1 * | 8/2002 | Heie | 455/574 |
| 2002/0132638 A1 * | 9/2002 | Plahte et al. | 455/555 |
| 2004/0033811 A1 * | 2/2004 | Tsai et al. | 455/554.1 |
| 2004/0264410 A1 * | 12/2004 | Sagi et al. | 370/331 |
| 2005/0078612 A1 * | 4/2005 | Lang | 370/260 |
| 2006/0023658 A1 | 2/2006 | Phillips et al. | |
| 2006/0058050 A1 * | 3/2006 | Park | 455/466 |

(Continued)

OTHER PUBLICATIONS

H. Schulzrinne et al., "RTP Payload for DTMF Digits, Telephony Tones and Telphony Signals", Network Working Group, May 2000, 1-30.

(Continued)

*Primary Examiner* — Jinsong Hu
*Assistant Examiner* — Qun Shen
(74) *Attorney, Agent, or Firm* — Varun A. Shah

(57) ABSTRACT

Extending dual-mode phones using SMS messages. When operating in cellular mode, SMS messages originated by a mobility controller in the enterprise command features such as indicators on the dual-mode phone. SMS messages are received by an agent in the dual-mode phone. A mobility controller connected to the enterprise SIP PBX and voicemail system receives messages for example indicating voicemail status and sends specially formatted SMS messages to the cellular phone to operate indicators. Similarly, the dual-mode phone issues SMS messages to the enterprise mobility controller to request the enterprise PBX perform features such as call conferencing, call pickup, and call pull.

12 Claims, 1 Drawing Sheet

(56) References Cited

U.S. PATENT DOCUMENTS

| | | | |
|---|---|---|---|
| 2006/0121902 A1* | 6/2006 | Jagadeesan et al. | 455/439 |
| 2006/0223555 A1 | 10/2006 | Kim | |
| 2006/0239277 A1 | 10/2006 | Gallagher | |
| 2007/0014260 A1 | 1/2007 | Seo | |
| 2007/0149176 A1* | 6/2007 | Wells et al. | 455/412.2 |
| 2007/0165825 A1 | 7/2007 | Ko et al. | |
| 2007/0207804 A1 | 9/2007 | Sharma et al. | |
| 2007/0268858 A1* | 11/2007 | Soto | 370/328 |
| 2007/0281682 A1* | 12/2007 | Raju et al. | 455/422.1 |
| 2008/0002605 A1* | 1/2008 | Todd et al. | 370/328 |
| 2008/0085728 A1* | 4/2008 | Reding et al. | 455/466 |
| 2008/0112392 A1 | 5/2008 | Mansfield | |
| 2008/0139228 A1* | 6/2008 | Raffel et al. | 455/466 |
| 2010/0105379 A1* | 4/2010 | Bonner et al. | 455/433 |

OTHER PUBLICATIONS

R. Mahy et al., "AMessage Summary and Message Waiting Indication Event Package for the Session Initiation Protocol (SIP)", Network Working Group, Aug. 2004, 1-19.

S. Bellovin et al., "Security Mechanisms for the Internet", Network Working Group, Dec. 2003, 1-20.

H. Schulzrinne et al., "RTP: A Transport Protocol for Real-Time Applications", Network Working Group, Jul. 2003, 1-89.

J. Rosenberg et al., "SIP: Session Initiation Protocol", Network Working Group, Jun. 2002, 1-269.

United States Office Action dated Nov. 15, 2010 for U.S. Appl. No. 11/963,275, filed on Dec. 12, 2007 entitled Indicators for dual mode phones.

United States Office Action dated Apr. 26, 2011 for U.S. Appl. No. 11/963,275, filed on Dec. 12, 2007 entitled Indicators for Dual Mode Phones.

United States Office Action dated Mar. 23, 2011 for U.S. Appl. No. 11/955,108, filed on Dec. 12, 2007.

United States Office Action dated Mar. 29, 2011 for U.S. Appl. No. 11/955,091, filed on Dec. 12, 2007 entitled Single Voicemail for Dual-Mode Phones.

United States Office Action dated Oct. 25, 2011 for U.S. Appl. No. 11/955,108, filed on Dec. 12, 2007.

United States Office Action dated Sep. 29, 2011 for U.S. Appl. No. 13/191,324, filed on Jul. 26, 2011.

United States Office Action dated Sep. 30, 2010 for U.S. Appl. No. 11/955,108, filed on Dec. 12, 2007 entitled Delayed Ack in Dual-Mode Call Handover.

United States Office Action dated Oct. 5, 2010 for U.S. Appl. No. 11/955,091, filed on Dec. 12, 2007 entitled Single Voicemail for Dual-Mode Phones.

United States Office Action dated Dec. 6, 2010 for U.S. Appl. No. 11/955,104, filed on Dec. 12, 2007 entitled Single Number Presentation for Dual-Mode Phones.

United States Office Action dated Jun. 17, 2010 for U.S. Appl. No. 11/955,104, filed on Dec. 12, 2007 entitled Single Number Presentation for Dual-Mode Phones.

United States Office Action dated Mar. 22, 2012 for U.S. Appl. No. 11/963,275, filed on Dec. 21, 2007.

* cited by examiner

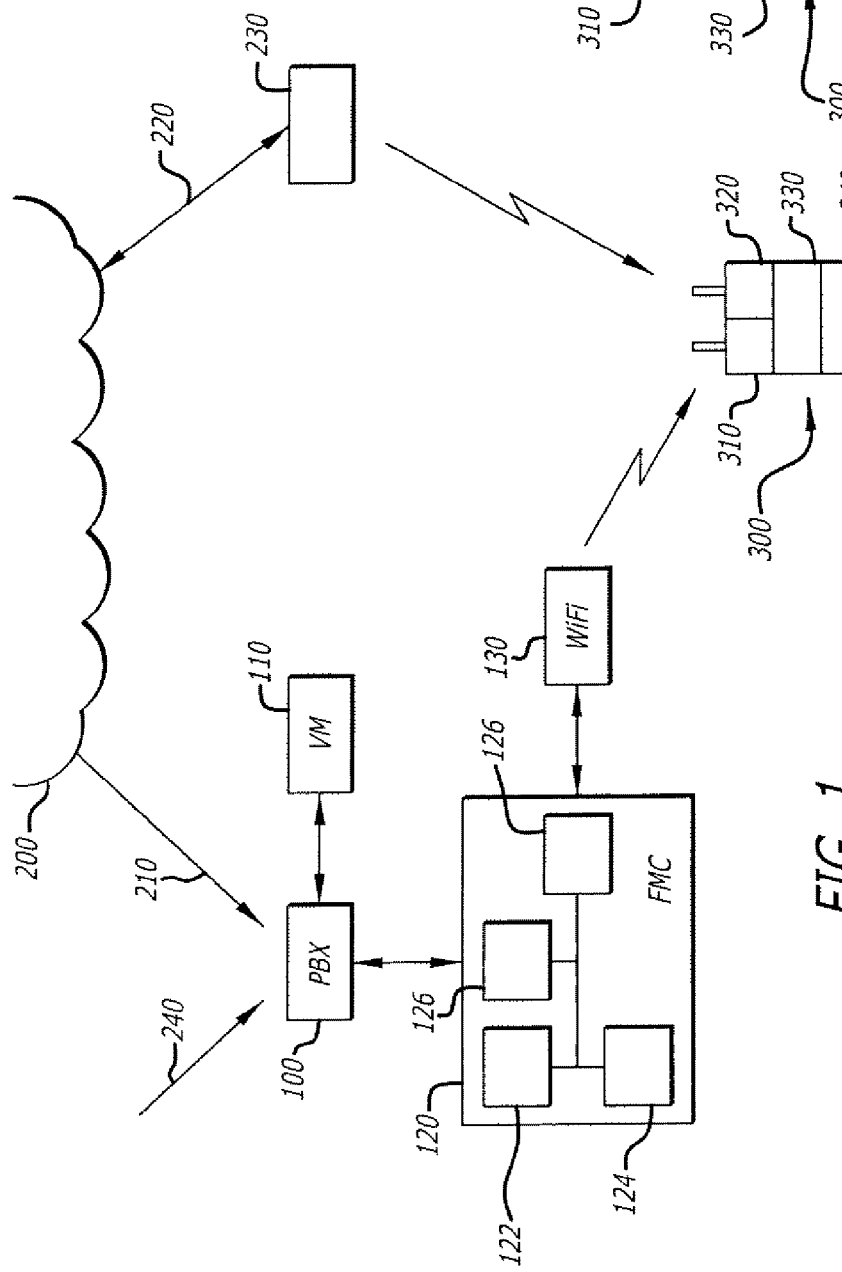
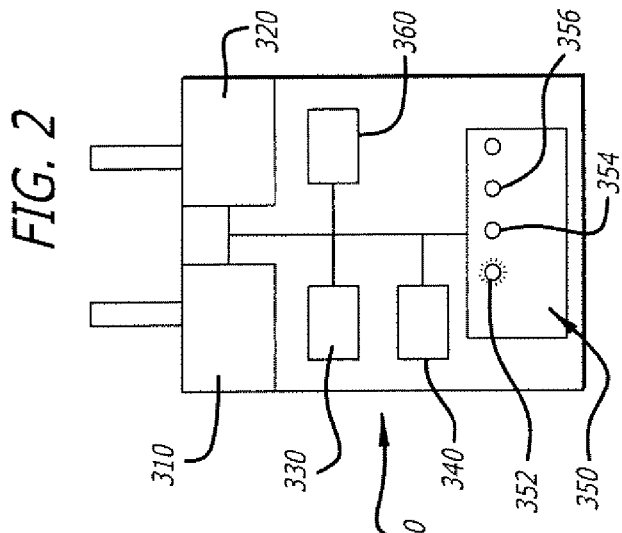

ENTERPRISE SEAMLESS MOBILITY

CROSS REFERENCE TO RELATED APPLICATIONS

The present application is a continuation-in-part application of U.S. patent application Ser. No. 11/963,275 filed Dec. 17, 2007.

BACKGROUND OF THE INVENTION

The present invention relates to the operation of dual-mode phones, and more particularly, to extending Private Branch Exchange (PBX) functionality in dual-mode phones.

Dual-mode phones support connections via Wi-Fi and cellular networks. While associated with the enterprise Wi-Fi network, the user places and receives calls through the enterprise Wi-Fi system. While out of range of the enterprise Wi-Fi network, the user places and receives calls through the cellular system.

As viewed from the point of view of the enterprise, dual-mode phones allow the enterprise to maintain connectivity with the user via the cellular network when the user is out of range of enterprise Wi-Fi coverage.

A problem arises however, as the enterprise PBX provides suite of capabilities to local enterprise users, and the cellular system provides different capabilities, most often a subset of those enterprise capabilities, to cellular users. When in the range of the enterprise Wi-Fi system, the dual-mode phone user can interact with the enterprise PBX through Session Initiation Protocol (SIP) Wi-Fi signaling. But when the dual-mode phone is connected to the cellular network, this signaling is not available.

What is needed is a method of extending enterprise PBX capabilities in a dual-mode phone connected through the cellular network.

BRIEF DESCRIPTION OF THE DRAWINGS

The invention may be best understood by referring to the following description and accompanying drawings that are used to illustrate embodiments of the invention in which:

FIG. 1 shows a dual-mode phone in a network, and

FIG. 2 shows a dual-mode phone.

DETAILED DESCRIPTION

Embodiments of the invention relate to dual-mode phones, and extending capabilities of dual-mode phones connected over the cellular network to a mobility controller and the enterprise PBX. In an embodiment of the invention, a dual-mode phone when operating in its cellular mode recognizes and interprets Short Message Service (SMS) messages to extend capabilities on the dual-mode phone. These SMS messages may be removed from the SMS log after processing. In the case of enterprise voicemail systems, a SIP back to back user agent (B2BUA) running in the enterprise environment subscribes to Message-Wait events generated by the PBX. When a message is left for the dual-mode phone user in the enterprise, the SIP PBX signals the agent, which generates and sends the proper SMS message to the cellular side of the dual-mode phone when it is outside of enterprise Wi-Fi range. Similarly, the dual-mode phone issues SMS messages providing a control channel to the mobility controller to request the PBX implement features such as call transfer, conferencing, call pickup, and call pull.

FIG. 1. shows an embodiment of the invention including a dual-mode phone. Enterprise SIP PBX communicates 210 with public switched telephone network (PSTN) 200. SIP PBX 100 also supports voicemail system 110. SIP PBX 100 also communicates with fixed mobility controller (FMC) 120. Mobility controller 120 bridges the worlds of SIP PBX 100 and Wi-Fi network controller 130. SIP PBX 100 and fixed mobility controller 120 communicate for example using protocols established by RFC 3261, RFC 2833, and RFC 3631, incorporated herein by reference. Voice streams are typically encoded using the RTP protocols defined by RFC 3550, incorporated herein by reference.

As understood in the art, such a hardware platform as shown in FIG. 1 for hosting mobility controller 120 includes a central processing unit (CPU) 122 connected to memory hierarchy 124, and to one or more interfaces 126. In one embodiment, CPU 122 is a MIPS-style CPU such as those from Raza Microelectronics or Cavium Networks, although CPUs from other companies such as Intel, AMD, Freescale, or the like may also be used. Memory hierarchy 124 includes read-only memory for system initialization, high-speed read-write memory such as DRAM, and bulk memory such as a hard disk or compact flash storage for files. Interfaces 126 include wired and wireless Ethernet interfaces as are known to the art. Controller 120 typically operates under the control of an operating system such as Linux, hosting software processes which provide device functionality. Additional hardware may be provided to provide for high-speed packet handling, crypto processing, and the like. While FIG. 1 shows mobility controller 120 and Wi-Fi network controller 130 as separate entities, it should be noted that they may also be software processes running on a shared hardware platform. As an example, a single hardware platform based on a multi-core MIPS processor such as those from Raza Microelectronics or Cavium Networks could host the functions of Wi-Fi network controller 130 along with mobility controller 120 and additional functions such as intrusion detection and/or firewalls.

Dual-mode phone 300 has first radio subsystem 310 for Wi-Fi communications such as to Wi-Fi network controller 130. Dual-mode phone 300 also has second radio subsystem 320 for communicating with cellular network 230 and through public switched telephone network 200. As is common with many such devices, dual-mode phone 300 is a digital device operating under control of CPU 330 through programs and data stored in memory hierarchy 340. Dual-mode phone 300 also has display 350 with indicators 352, 354, 356. In one embodiment, display 350 is a liquid crystal display. Indicators 352, 354, 356 may be separate display elements such as light emitting diodes, or they may be fixed designs on liquid crystal display 350, or may be areas on display 350 in which different symbols may be displayed such as by providing different bitmaps representing the symbol to be displayed as an indicator. Other aspects of dual-mode phone 300 such as speakers, microphones, power, keyboards and the like are understood by those in the art, and are not shown.

In operation, when dual-mode phone 300 is in the range of enterprise Wi-Fi network controller 130, indicators 352, 354, 356 may be controlled by SIP signaling over the Wi-Fi network as described in RFC 3842, incorporated herein by reference. As an example, mobility controller 120 contains a back to back user agent (B2BUA) software process which subscribes to message wait events produced by SIP PBX 100. Messages from PBX 100 and voicemail system 110 may be communicated as SIP messages through network controller 130 to alert the user of events of interest, such as waiting voicemail, text messages, emails, or the like. Such SIP messages are transmitted over the Wi-Fi network to a user agent process operating in dual-mode phone 300, and can activate and/or deactivate indicators 352, 354, 356.

Such indicators 352, 354, 356 in dual-mode phone 300 can also be used to indicate other conditions such as the presence of text or e-mail messages, or other conditions.

According to an embodiment of the invention, when dual-mode phone 300 is not within the range of the enterprise Wi-Fi network, mobility controller 120 cannot use SIP or SIP-style messaging. Instead, mobility controller 120 produces a SMS message which is sent through SIP PBX 100 over public switched telephone network 200 to the cellular number associated with dual-mode phone 300. In an alternate embodiment, e-mail messages may be used.

When the SMS message is received through radio subsystem 320 by dual-mode phone 300, agent 360 recognizes the SMS message, and takes appropriate action with respect to indicators 352, 354, 356.

Agent 360 on recognizing the SMS message may remove the SMS message from the queue after taking the appropriate action with respect to indicators 352, 354, 356. In such an embodiment, the user of dual-mode phone 300 will not see such SMS messages.

Appropriate SMS messages for agent 360 may be recognized by the message header, or by message contents. One SMS message may alter a single indicator, or multiple indicators. An SMS message may indicate that a fixed indicator is to be turned on, turned off, or flashed. In some embodiments, an SMS message may include data such as a bitmapped image for an icon to be displayed on screen 350.

SMS messages for agent 360 may be authenticated, for example to reduce transmission errors and/or spoofing. Such authentication may be accomplished, for example, by verifying the sender of the SMS message for agent 360 against one or more authorized senders. SMS messages for agent 360 may be authenticated using check digits, checksums, or digital signatures.

According to another aspect of the invention, dual-mode phone 300 also uses SMS messages to communicate information back to mobility controller 120.

As an example, call transfer may be facilitated through the use of SMS messages sent from dual-mode phone 300 to mobility controller 120. When dual-mode phone 300 is connected over the cellular and public switched network 200 and wishes to transfer a call, it sends an SMS message with the target number to mobility controller 120. On receiving the SMS message, mobility controller 120 extracts the content, optionally validating and/or authenticating the content, and sends a SIP-standard REFER command to SIP PBX 100. PBX 100 then transfers the call to the desired number. Once the transfer is completed, PBX 100 sends a SIP NOTIFY event to mobility controller 120. Mobility controller 120 may then notify dual-mode phone 300 using a SMS message.

As a further example, such SMS messages may also be used for conferencing. In a first example, dual-mode phone 300 is connected over the cellular and public switched network 200 to party B and wishes to conference in party C, dual-mode phone 300 sends an SMS message containing the particulars of C to mobility controller 120. On receiving the SMS message, mobility controller 120 extracts the content, optionally validating and/or authenticating, and sends SIP messages to PBX 100 causing PBX 100 to initiate a call with C, and shuffle the audio with B to a conference bridge, also sending a SIP NOTIFY to mobility controller 120 which may use an SMS message to notify dual-mode phone 300 of success.

In another conferencing example where dual-mode phone 300 is in a cellular call with two callers B and C where B is in the held state and C is in the active state, dual-mode phone 300 may initiate conferencing by sending an SMS message to mobility controller 120. As before, mobility controller 120 extracts the SMS message content, optionally validating and/or authenticating, and sends SIP messages to PBX 100 causing PBX 100 to initiate shuffle the audio with B and C to a conference bridge, also sending a SIP NOTIFY to mobility controller 120 which may use an SMS message to notify dual-mode phone 300 of success.

As a further example, PBX features such as call pickup and call pull may also be implemented using SMS messages. Dual-mode phone 300 may issue an SMS message to mobility controller 120 requesting call pickup from a specified extension or group of extensions. Call pull is similar to conferencing, allowing the user of dual-mode phone 300 to pull an existing call handled by PBX 100 to dual-mode phone 300 by issuing a SMS message to mobility controller 120.

Mobility controller 120 may validate and/or authenticate SMS messages for example by validating the originating cell phone number against a list of cell phone numbers authorized to use the particular feature, or against a list of cell phone numbers for authorized users. Authentication may also be applied to target numbers As before, check digits, checksums, or digital signatures may also be used. Authentication may also be done by class, for example with originating cell phone numbers being grouped into classes, each with a different level of privileges and/or capabilities. While one class, for example, may only be allowed to transfer calls to, or to conference in calls from a limited set of target numbers, other classes may be allowed to transfer calls to, or to conference in calls from a wider set of target numbers.

While the invention has been described in terms of various embodiments, the invention should not be limited to only those embodiments described, but can be practiced with modification and alteration within the spirit and scope of the appended claims. The description is this to be regarded as illustrative rather than limiting.

What is claimed is:

1. A method comprising:
    receiving, by a mobility controller, a first Short Message Service (SMS) message from a cellular-PBX multimode phone while the cellular-PBX multimode phone is on a current ongoing call;
    wherein the first SMS message comprises a target number that is to be used in a call function for the cellular-PBX multimode phone;
    extracting, by the mobility controller, the target number from the first SMS message;
    transmitting, by the mobility controller to a Private Branch Exchange (PBX), a second Session Initiation Protocol (SIP) message;
    wherein the second SIP message is transmitted for initiating the call function for the cellular-PBX multimode phone based at least on the first SMS message received from the cellular-PBX multimode phone;
    wherein the initiating operation comprises initiating call conferencing of the current ongoing call for the cellular-PBX multimode phone to include an additional phone that corresponds to the target number in the first SMS message;
    wherein the mobility controller comprises a hardware processor.

2. The method of claim 1 wherein the initiating operation comprises initiating a call transfer of a current ongoing call for the cellular-PBX multimode phone to a different phone that corresponds to the target number in the first SMS message.

3. The method of claim 1 wherein the initiating operation comprises initiating a call pickup by transferring a new call, originally directed to the cellular-PBX multimode phone, to a different phone that corresponds to the target number in the first SMS message.

4. The method of claim 1 wherein the initiating operation comprises initiating a call pull.

5. A mobility controller comprising:
at least one hardware processor;
the mobility controller being configured to perform operations comprising:
receiving, by the mobility controller, a first Short Message Service (SMS) message from a cellular-PBX multimode phone while the cellular-PBX multimode phone is on a current ongoing call;
wherein the first SMS message comprises a target number that is to be used in a call function for the cellular-PBX multimode phone;
extracting, by the mobility controller, the target number from the first SMS message;
transmitting, by the mobility controller to a Private Branch Exchange (PBX), a second Session Initiation Protocol (SIP) message;
wherein the second SIP message is transmitted for initiating the call function for the cellular-PBX multimode phone based at least on the first SMS message received from the cellular-PBX multimode phone;
wherein the initiating operation comprises initiating a call conferencing of the current ongoing call for the cellular-PBX multimode phone to include an additional phone that corresponds to the target number in the first SMS message.

6. The system of claim 5 wherein the initiating operation comprises initiating a call transfer of a current ongoing call for the cellular-PBX multimode phone to a different phone that corresponds to the target number in the first SMS message.

7. The system of claim 5 wherein the initiating operation comprises initiating a call pickup by transferring a new call, originally directed to the cellular-PBX multimode phone, to a different phone that corresponds to the target number in the first SMS message.

8. The system of claim 5 wherein the initiating operation comprises initiating a call pull.

9. A non-transitory computer readable medium comprising instructions which, when executed by one or more hardware processors, cause performance of operations comprising:
receiving, by a mobility controller, a first Short Message Service (SMS) message from a cellular-PBX multimode phone while the cellular-PBX multimode phone is on a current ongoing call;
wherein the first SMS message comprises a target number that is to be used in a call function for the cellular-PBX multimode phone;
extracting, by the mobility controller, the target number from the first SMS message;
transmitting, by the mobility controller to a Private Branch Exchange (PBX), a second Session Initiation Protocol (SIP) message;
wherein the second SIP message is transmitted for initiating the call function for the cellular-PBX multimode phone based at least on the first SMS message received from the cellular-PBX multimode phone;
wherein the initiating operation comprises initiating call conferencing of the current ongoing call for the cellular-PBX multimode phone to include an additional phone that corresponds to the target number in the first SMS message.

10. The medium of claim 9 wherein the initiating operation comprises initiating a call transfer of a current ongoing call for the cellular-PBX multimode phone to a different phone that corresponds to the target number in the first SMS message.

11. The medium of claim 9 wherein the initiating operation comprises initiating a call pickup by transferring a new call, originally directed to the cellular-PBX multimode phone, to a different phone that corresponds to the target number in the first SMS message.

12. The medium of claim 9 wherein the initiating operation comprises initiating a call pull.

* * * * *